Jan. 29, 1957
C. A. WINSLOW
2,779,433
AIR FILTER
Filed Jan. 14, 1955
2 Sheets-Sheet 2
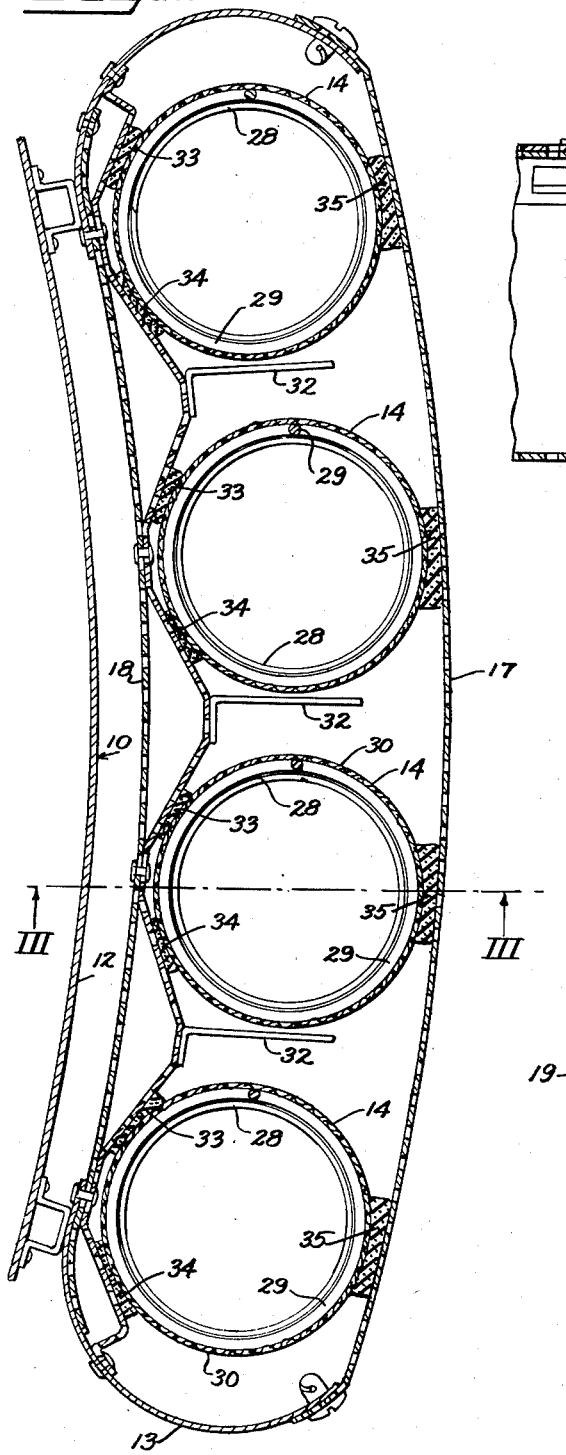
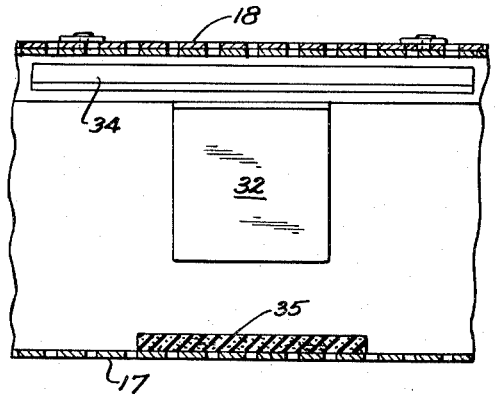
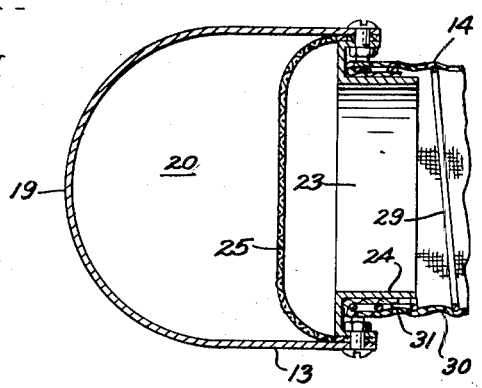
INVENTOR.
CHARLES A. WINSLOW
ATTORNEY.

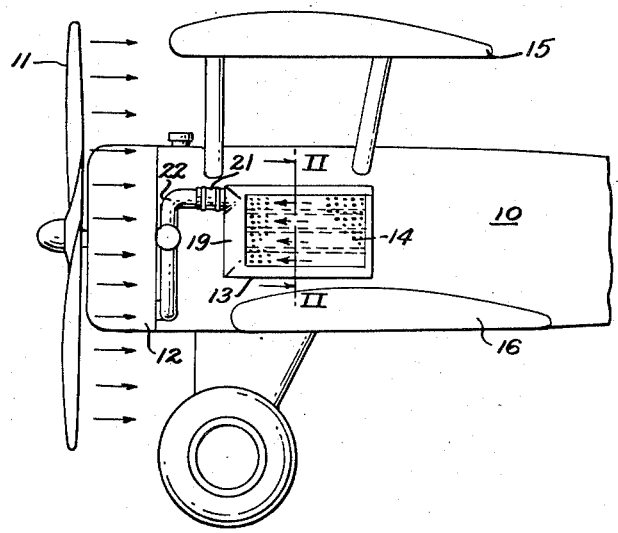
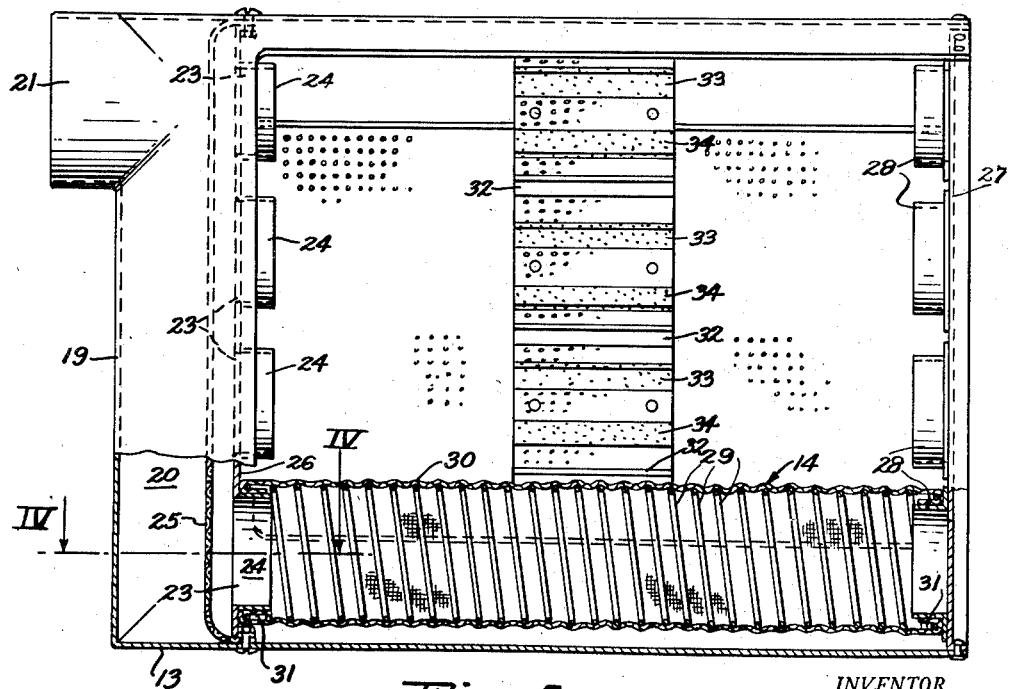

United States Patent Office 2,779,433
Patented Jan. 29, 1957

2,779,433

AIR FILTER

Charles A. Winslow, Oakland, Calif., assignor to Winslow Aerofilter Corporation, Oakland, Calif., a corporation of California Application January 14, 1955, Serial No. 481,879

9 Claims. (Cl. 183—58)

This invention relates to improvements in air filtering devices for use in aircraft and particularly to improvements in filters for use in aircraft operating under conditions where dust is encountered in the air.

One of the problems solved by the present invention arises in the use of airplanes for crop dusting where the dust being used for dusting the crops is sucked into the engine. Various kinds of dust are used for this purpose, some of which must necessarily contain material which is a good conductor of electricity. The effect of this material being drawn into the cylinders of the engine has been to coat the insulating surfaces of the spark plugs causing the plugs to short out at critical times, especially when the throttle was opened for full load. Numerous fatal crashes have been traced to this cause and for a long time the art has sought a solution to the problem.

Another problem solved by the present invention relates to the damage done the engine as some of the dust being sprayed on the crop is drawn into the cylinders where it produces accelerated engine wear.

Air cleaners of various types heretofore used have had a relatively short life as the dust collected on the elements has impeded the air flow to the engine. This has upset carburetor balance, horsepower output of the engine, and has deprived the engine of the needed air intake to achieve full power especially at such critical times as when immediate full power is needed by the crop duster when maneuvering.

One of the objects of the present invention is to provide a filtering device which will supply clean air to the engine carburetor intake under all conditions of operation at practically atmospheric pressure, regardless of how much dust is in the air.

Another object of the invention is the provision of a filtering device which will be self-cleaning in operation and therefore will not build up caked dust on the filtering surface to impede the flow of air to the engine intake.

Another object of the invention is to provide a filtering device having a plurality of filtering elements which are flexibly supported and preferably subject to the effect of the propeller blast of the plane to which they are attached.

Another object of the invention is to provide a novel combination of filter element and filter housing whereby substantially the whole area of the filtering element is effective for filtering and subject to being kept clean by the combination of vibration and the flow of the air stream from the propeller blast.

Another object of the invention is to provide a novel air filter having the filter elements self-supported by end compression with a flexible central support which leaves each element free to vibrate between its ends and thereby shake loose the coagulated dust.

Other objects and advantages will be apparent from the following description taken in connection with the drawings, in which:

Fig. 1 is a view in elevation of a portion of the front end of an airplane such as is currently in use for crop dusting, and shows the device of this invention mounted alongside the fuselage in position to receive the air flow from the propeller;

Fig. 2 is a view in elevation and cross section taken on the line II—II of Fig. 1 and shows a filter case having in it four removable filter elements;

Fig. 3 is a view in cross section taken on the line III—III of Fig. 2 with the filter element removed;

Fig. 4 is a view in cross section taken on the line IV—IV of Fig. 5; and

Fig. 5 is a view in side elevation, partly in section, of the filter casing showing one filter element in place and the other three elements removed.

While I shall describe the preferred embodiment as shown in these drawings, I do not intend thereby to limit my invention to this embodiment except as may be required by the appended claims. Also while the invention is shown as attached to an airplane, it has applicability to other uses where in use it will be subjected to vibration and the flow of an air stream, such as in the case of railroad locomotives or other vehicles where the air flow is produced either by movement of the vehicle or by a fan.

As shown in Fig. 1, the device of my invention is mounted on the side of the fuselage 10 of an airplane aft of the propeller 11 and the engine cowling 12 where the filter casing 13 enclosing the filter elements 14 will be in the air stream created by the propeller. As previously noted, when applied to aircraft, it is most useful in planes used for crop dusting, and such planes usually have two wings 15 and 16.

The filter casing 13 is shown in more detail in Figs. 2 and 5 and has a screen or perforated cover 17 and preferably perforated back wall 18 which exposes the filter elements 14 to the aforementioned air stream. Other details of construction of the filter casing may be varied to suit the designer's choice. The one shown here for purposes of illustration has end members on which the perforated cover 17 and back wall 18 are supported. The forward end member 19 comprises a manifold 20 with a suitable outlet 21 adapted to be connected to an elbow duct 22 which is connected at its other end to the carburetor air inlet. For convenience of mounting, the outlet 21 may be located anywhere along the manifold 20. The wall 26 of the manifold 20 has openings 23 each surrounded by a flange 24 adapted to receive and support one end of its associated filter element 14. These openings 23 are covered on the manifold side by a safety screen 25 which acts as a backfire trap in case the engine should backfire through the carburetor.

The rear end member 27 of the filter casing 13 is imperforate, forming a closed end for each filter element 14 and may comprise a stamping having flanged supporting rims 28 secured to it, each adapted to receive and support the after end of one of the filter elements 14.

The filter elements 14 may be of varied construction and preferably are flexible in all directions for the purpose of aiding in the dislodging of coagulated dust. A very satisfactory form for such elements 14 is shown in Fig. 5 of the drawings and comprises an easily flexed resilient helical spring 29 with a covering over it preferably of a knitted tubular fabric 30, which has its ends turned in and held by a suitable fastening member 31.

Due to the free flexing of the filter element spring 29, each element 14 requires support midway between its ends 31 which, prior to closing the cover 17, is provided in the filter casing by the short flanged members 32. After closing of the cover 17, support is provided by the three spaced resilient pads, 33 and 34, secured to the back of the housing and pad 35 carried on the cover 17. When each element 14 is supported by these pads, it is lifted off the adjacent flanged member 32 thus assuring a free vibration and flexing of the element 14 between its rigidly supported ends.

These pads 33, 34 and 35 may be made of any resilient material, and foam rubber or soft felt have proven satisfactory. The action produced by the rigid mounting of each filter element 14 at its ends to the filter casing flanges 24, 28, and the soft resilient connection provided between the element and the filter casing 13 by the pads 33, 34 and 35 produces a vibration of the filter element which is particularly effective in shaking loose the coagulated dust during operation of the airplane engine.

"Coagulated" has been used here in the sense of describing how the dust accumulates in a thin layer and then flakes off in small coagulated chips.

With the filter elements rigidly supported at their ends and with the resilient support placed around each filter element somewhere between its ends, and with the propeller air stream entering the filter casing through its perforate sides, the action produced on the filter elements is such that the cover fabric 30 and the spring 29 are vibrated continuously. This might be characterized as rigid end and flexible mid point suspension. The movement serves to break off the dust cake in small coagulated clots or chips and prevents the build up of an impervious dust cake on the fabric 30.

In other words, when used on an airplane, the shaking and vibration of the plane fuselage causes the filter casing 13 to vibrate. The two ends of each filter element 14 move with the casing 13, and the center portion of each filter element, being only resiliently connected to the casing, moves, but usually in a different direction and at a different vibration period in relation to its ends. This unlike movement of the center portion in relation to the ends is further accentuated by the air flow around the outside of the elements. The net effect is to maintain the filtering material 30 on the elements 14 in a state of substantially constant undulating vibration, with the air stream passing along the outside and peeling off, as it were, any accumulated particles of dust. This is a new method of operation in a filter and arises from the new arrangement of the parts. While I have described the invention in relation to an airplane installation, like results are obtained in its use on a tractor, locomotive or other vehicle.

Another feature of interest in use of the device on an airplane is that the pressure of the air stream from the propeller is impressed on the fabric 30 of the element. This pressure tending to urge the flow of air through the fabric, assists the carburetor suction in producing the flow. In tests with a pressure gauge placed on each side of the fabric 30, the reading was substantially the same, indicating that very little, if any, work was required of the reduced intake manifold pressure in drawing air through the element.

In Fig. 1 the arrows pointing toward the propeller indicate the direction of flow of air inside the filter elements 14 on its way to the manifold 20 and to the carburetor air inlet 22.

In describing a preferred embodiment of my invention in compliance with the Statute, I do not thereby intend to limit the invention to this one form, as variations may be made without departing from the invention and still come within the scope of the appended claims. For example, some designers may decide to omit the screen covers 17 and 18 on the casing 13 and mount the resilient pads 33, 34 and 35 on straps. Another modification would be to omit the flanges 28 on which the after end of the elements is supported and let the resilient pads 33, 34 and 35 support the elements from the mid point aft. In this case the end of the fabric 30 would be drawn across the end of the spring 29 to close that end of the element 14.

I claim:
1. In an air filter adapted for installation on a member which vibrates in use, the combination of a hollow, flexible filter element; a casing therefor, having end walls, one of said end walls including a manifold to be connected to the air intake on an internal combustion engine; opening means in said manifold adapted to support one end of said hollow filter element; means on the other end wall for supporting the other end of said hollow filter element; and resilient means placed between the aforesaid two supports and between said element and said casing for resiliently supporting the mid section of said hollow filter element, whereby said mid section is caused to vibrate at a different period than its ends.

2. An air filter adapted for installation on a machine which vibrates in use, including a casing rigidly secured to said machine, and connected to its air inlet; a filter element secured at one end to said casing, said filter element having a flexible resilient core with a pervious filtering material covering it and in contact with it at many points along its length, and a resilient steadying means in contact with said filter element at a point remote from where it is secured to said casing, whereby the vibration transmitted to the secured end of said element will be at a different period than other portions of the element and will produce an undulating effect on the surface of the filtering material that shakes off solids trapped by the filtering material.

3. The device of claim 2 in which said core is a coil spring made of easily flexed material.

4. An air filter adapted for use on engine-driven machines where it is subject to vibration and to the flow of an air stream, including in combination a casing with open side walls through which dust-bearing air freely flows in; a plurality of filter elements mounted in said casing, each element comprising a helical spring made from easily flexed material with its loops covered by and in contact with a continuous tubular porous covering; a manifold at one end of said casing to which one end of each element is rigidly secured, and into which the interior of each element opens; means for connecting said manifold to the air inlet of the engine; means for rigidly securing the opposite end of the elements to the casing, the rigid securing of the ends thereby preventing relative longitudinal movement between the two ends; and resilient means mounted on said casing and supporting said filter elements in between their supported ends, whereby the combined effect of the vibration of the casing is transmitted to the filter elements through the rigid connections at the ends while the resilient mid-support of the filter elements leaves the remainder of the filter elements free to vibrate at a different period to produce an undulating effect along the surface of the elements that shakes off dust therefrom.

5. In an air filter adapted for use on machines where it is subject to vibration and flow of an air stream coaxially with the filter elements, said filter having a casing with open sides, a plurality of filter elements having a flexible core supporting a porous filter covering, a manifold at one end of said casing to which one end of each filter element is firmly and rigidly secured, means for firmly and rigidly securing the opposite end of the elements to said casing so that the two ends remain fixed relative to each other, and means for connecting said manifold to the air inlet on an engine, the combination therewith of a casing-supported resilient support for the filter elements in between their firmly supported ends, whereby the combined effect of the vibration of the casing is transmitted to the filter elements through the firm connections at the ends and the resilient mid-support of the filter elements leaves the remainder of the filter elements free to vibrate at a different period to produce an undulating effect along the surface of the elements;

6. A self-cleaning air filter for removing dust from air supplied to an engine that subjects the filter to vibration, comprising a casing with freely air-permeable side walls and subject to the vibration of said engine; a plurality of filter elements each having an easily flexed helical spring around whose loops is fitted a knitted tubular fabric covering, each end of said elements being rigidly secured to said casing against relative lengthwise movement; a manifold connecting one end of the interiors of said elements with said engine; and a soft resilient pad secured to said casing and supporting each said element in between its ends, so that vibration of the filter elements through its ends causes vibration of said helical spring and its fabric covering at a different frequency.

7. The filter of claim 6 wherein the pad is made from foam rubber.

8. The filter of claim 6 wherein the pad is made from felt.

9. An air filter that is self cleaning when vibrated, comprising a helical spring, a knitted fabric tube fitted around said spring through whose walls air can pass, a casing having rigid mounting means for each end of the spring-fabric combination against relative lengthwise movement, one said means including an outlet passage for filtered air, and a resilient pad connecting said casing to said spring-fabric combination in between its ends.

References Cited in the file of this patent

UNITED STATES PATENTS

| | | |
|---|---|---|
| 1,398,685 | Gordon | Nov. 29, 1921 |
| 1,757,834 | Haegler | May 6, 1930 |
| 2,203,570 | Hollebone | June 4, 1940 |
| 2,414,564 | Silverman et al. | Jan. 21, 1947 |

FOREIGN PATENTS

| | | |
|---|---|---|
| 101,291 | Great Britain | June 7, 1917 |
| 513,347 | Great Britain | Oct. 10, 1939 |